US012069704B2

(12) United States Patent
Balasingam et al.

(10) Patent No.: US 12,069,704 B2
(45) Date of Patent: Aug. 20, 2024

(54) LEARNED SCHEDULER FOR FLEXIBLE RADIO RESOURCE ALLOCATION TO APPLICATIONS

(71) Applicant: Microsoft Technology Licensing, LLC, Redmond, WA (US)

(72) Inventors: Arjun Varman Balasingam, San Jose, CA (US); Paramvir Bahl, Bellevue, WA (US); Manikanta Kotaru, Kenmore, WA (US)

(73) Assignee: Microsoft Technology Licensing, LLP, Redmond, WA (US)

( * ) Notice: Subject to any disclaimer, the term of this patent is extended or adjusted under 35 U.S.C. 154(b) by 92 days.

(21) Appl. No.: 17/356,161

(22) Filed: Jun. 23, 2021

(65) Prior Publication Data
US 2022/0417948 A1    Dec. 29, 2022

(51) Int. Cl.
*H04W 72/54* (2023.01)
*G06N 20/00* (2019.01)
(Continued)

(52) U.S. Cl.
CPC ............ *H04W 72/54* (2023.01); *G06N 20/00* (2019.01); *H04W 72/0446* (2013.01); *H04W 72/23* (2023.01)

(58) Field of Classification Search
CPC ......... H04W 72/1226; H04W 72/0446; H04W 72/14; H04W 72/02; H04W 72/048; H04W 72/06; H04W 72/08
See application file for complete search history.

(56) References Cited

U.S. PATENT DOCUMENTS

2014/0313908 A1\* 10/2014 da Silva .............. H04W 72/042 370/252
2018/0199334 A1\* 7/2018 Ying ................... H04W 72/042
(Continued)

FOREIGN PATENT DOCUMENTS

KR    102030128    \* 2/2018

OTHER PUBLICATIONS

"Deep Learning Assisted CSI Estimation for Joint URLLC and eMBB Resource Allocation" by Khan et al. published in 2020 (Year: 2020).\*

(Continued)

*Primary Examiner* — Nishant Divecha
(74) *Attorney, Agent, or Firm* — ArentFox Schiff LLP

(57) ABSTRACT

Aspects include a machine learning based resource block scheduler configured to meet service level requirements of applications. Aspects include receiving a plurality of scheduling requests each associated with a respective application of a plurality of applications on a plurality of wireless devices, identifying a plurality of current channel state information each associated with one of the plurality of wireless devices, and identifying a plurality of different types of service level requirements each associated with one of the plurality of applications. Further, the aspects include determining, by a machine learning based scheduler based on each of the plurality of current channel state information, a sequence of resource assignments expected to meet the plurality of different types of service level requirements, the sequence of resource assignments including a plurality of grants of a scheduled assignment of a resource, and transmitting respective grants for the respective applications to the wireless devices.

17 Claims, 11 Drawing Sheets

(51) Int. Cl.
*H04W 72/0446* (2023.01)
*H04W 72/23* (2023.01)

(56) References Cited

U.S. PATENT DOCUMENTS

| | | | |
|---|---|---|---|
| 2019/0268894 A1* | 8/2019 | Cho | H04W 72/048 |
| 2020/0052757 A1 | 2/2020 | Wang et al. | |
| 2020/0053591 A1 | 2/2020 | Prasad | |
| 2020/0267753 A1* | 8/2020 | Adjakple | H04W 72/14 |
| 2021/0091838 A1* | 3/2021 | Bai | H04B 7/0639 |
| 2021/0185700 A1 | 6/2021 | Pezeshki et al. | |
| 2021/0329668 A1* | 10/2021 | Singh Shekhawat | G06N 3/006 |
| 2021/0351885 A1* | 11/2021 | Chavva | H04L 5/0048 |
| 2022/0239417 A1* | 7/2022 | Cheng | H04L 1/1896 |
| 2022/0243568 A1* | 8/2022 | AlTammar | E21B 47/12 |

OTHER PUBLICATIONS

"International Search Report and Written Opinion Issued in PCT Application No. PCT/US22/030980", Mailed Date: Sep. 1, 2022, 10 Pages.

* cited by examiner

600 ↘

```
┌─────────────────────────────────────────────────────────────┐
│  RECEIVING A PLURALITY OF SCHEDULING REQUESTS EACH          │
│  ASSOCIATED WITH A RESPECTIVE APPLICATION OF A PLURALITY OF │
│  APPLICATIONS ON A PLURALITY OF WIRELESS DEVICES            │
│                          602                                │
└─────────────────────────────────────────────────────────────┘
```
↓

IDENTIFYING A PLURALITY OF CURRENT CHANNEL STATE INFORMATION EACH ASSOCIATED WITH ONE OF THE PLURALITY OF WIRELESS DEVICES
604

↓

IDENTIFYING A PLURALITY OF DIFFERENT TYPES OF SERVICE LEVEL REQUIREMENTS EACH ASSOCIATED WITH ONE OF THE PLURALITY OF APPLICATIONS
606

↓

DETERMINING, BY A MLBS BASED ON EACH OF THE PLURALITY OF CURRENT CHANNEL STATE INFORMATION, A SEQUENCE OF RESOURCE ASSIGNMENTS EXPECTED TO MEET THE PLURALITY OF DIFFERENT TYPES OF SERVICE LEVEL REQUIREMENTS, THE SEQUENCE OF RESOURCE ASSIGNMENTS INCLUDING A PLURALITY OF GRANTS OF A SCHEDULED ASSIGNMENT OF A RESOURCE AND A MODULATION CODING SCHEME TO EACH OF THE PLURALITY OF APPLICATIONS
608

↓

TRANSMITTING RESPECTIVE ONES OF THE PLURALITY OF GRANTS FOR THE PLURALITY OF APPLICATIONS TO THE PLURALITY OF WIRELESS DEVICES
610

FIG. 6

LEARNED SCHEDULER FOR FLEXIBLE RADIO RESOURCE ALLOCATION TO APPLICATIONS

BACKGROUND

Fifth generation (5G) New Radio (NR) mobile networks offer the ability to connect tens of billions of intelligent devices and provide various telecommunication services such as telephony, video, data, messaging, and broadcasts. 5G NR mobile networks may provide these services within a multitude of usage scenarios (e.g., enhanced mobile broadband, massive machine type communications, ultra-reliable low latency communications, etc.). Typically, wireless communication systems may employ multiple-access technologies capable of supporting communication with multiple users by sharing available system resources. For example, a mobile network may employ schedulers that allocate time-frequency resources to users. Many schedulers are incapable of supporting heterogeneous networks with devices and applications having a variety of needs and/or objectives. For example, the schedulers may be unable to meet different types of service level requirements associated with users experiencing varying wireless conditions.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include receiving a plurality of scheduling requests each associated with a respective application of a plurality of applications on a plurality of wireless devices, identifying a plurality of current channel state information each associated with one of the plurality of wireless devices, and identifying a plurality of different types of service level requirements each associated with one of the plurality of applications. Further, the method may include determining, by a machine learning based scheduler (MLBS) based on each of the plurality of current channel state information, a sequence of resource assignments expected to meet the plurality of different types of service level requirements, the sequence of resource assignments including a plurality of grants of a scheduled assignment of a resource and a modulation coding scheme to each of the plurality of applications, and transmitting respective ones of the plurality of grants for the plurality of applications to the plurality of wireless devices.

In another aspect, a device may include a memory, and at least one processor coupled to the memory and configured to: receive a plurality of scheduling requests each associated with a respective application of a plurality of applications on a plurality of wireless devices, identify a plurality of current channel state information each associated with one of the plurality of wireless devices, identify a plurality of different types of service level requirements each associated with one of the plurality of applications, determine, by a MLBS based on each of the plurality of current channel state information, a sequence of resource assignments expected to meet the plurality of different types of service level requirements, the sequence of resource assignments including a plurality of grants of a scheduled assignment of a resource and a modulation coding scheme to each of the plurality of applications, and transmit, via a control channel, respective ones of the plurality of grants for the plurality of applications to the plurality of wireless devices.

In another aspect, an example computer-readable medium storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 6 is a flow diagram illustrating an example method for employing a resource block scheduler using ML, in accordance with some aspects of the present disclosure.

DETAILED DESCRIPTION

Figure 1:
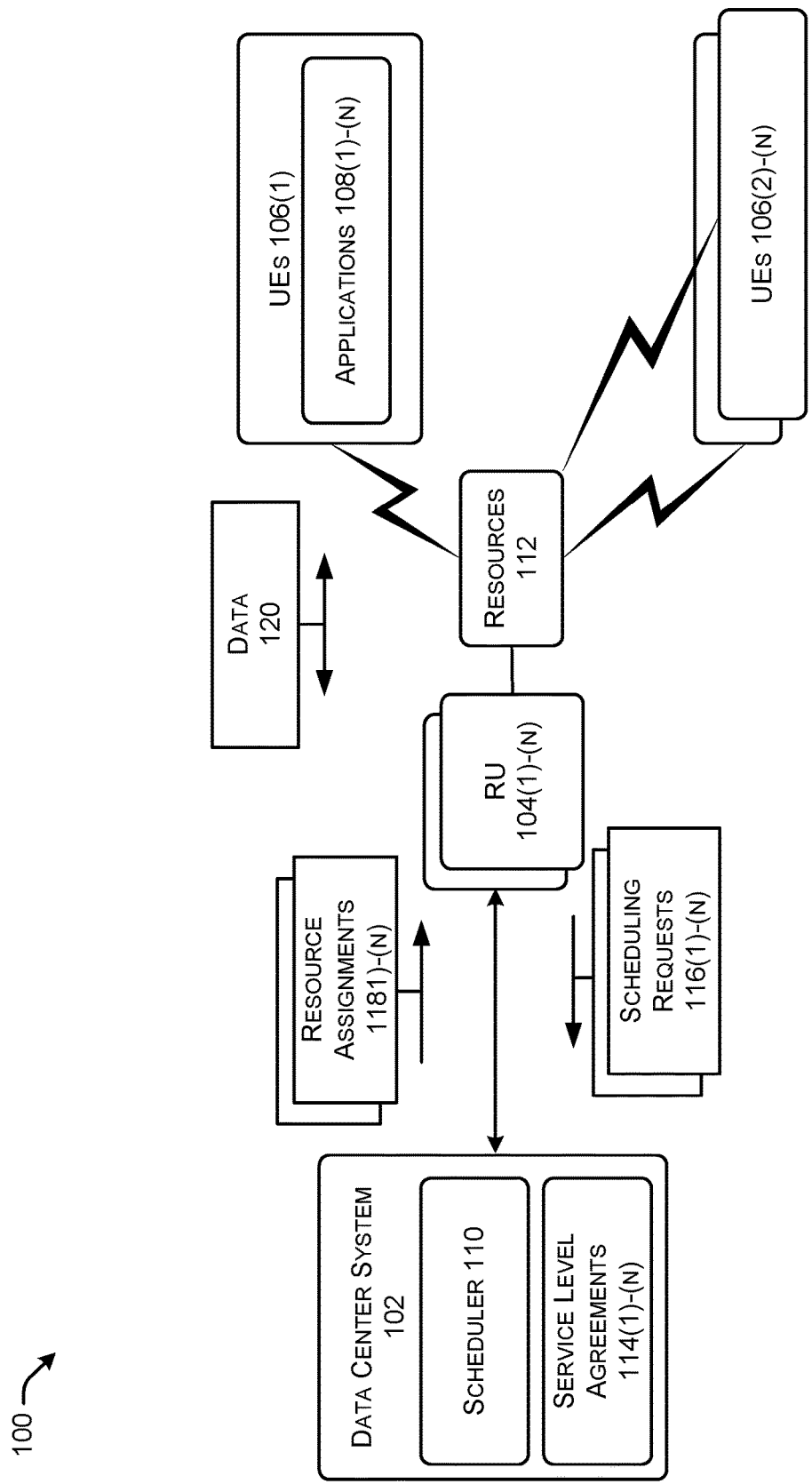
FIG. 1 is a diagram showing an example of a wireless communication system, in accordance with some aspects of the present disclosure

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for employing a resource block scheduler using machine learning (ML) in the presence of varying and uncertain channel conditions. In particular, aspects of the present disclosure provide a ML based scheduler (MLBS) configured to periodically determine a sequence of time-frequency resource assignments for a plurality of UEs that meet different types of service level requirements associated with the plurality of UEs. Accordingly, for example, a wireless communication system may employ the MLBS to provide resource allocation to networks with devices and/or applications having a variety of needs and/or objectives.

In accordance with some aspects of the present disclosure, a scheduler may determine resource assignments that satisfy different types of service level requirements associated with UEs that may be experiencing different wireless conditions. For example, a cloud computing environment may provide cloud computing applications and services to a plurality of user equipments (UEs) via a RAN. Further, a datacenter (DC) may provide higher network layer functionality to the RAN, e.g., the datacenter may include a scheduler configured to schedule the radio resources of the RAN. In some aspects, the scheduler may periodically allocate individual time-frequency resource blocks to an uplink transmission from one of the UEs or a downlink transmission to one of the UEs, and determine a modulation rate for each resource block. Furthermore, in order to meet the increasing and varying demands on modern wireless networks, the scheduler may employ ML to periodically determine resource assignments that satisfy different types of service level requirements based on state information.

Modern telecommunication standards have been developed to meet a wide array of new requirements associated with latency, reliability, security, and scalability, which provide greater flexibility to support heterogeneous applications having different priorities (e.g., maximizing throughput, minimizing cloud compute, minimizing latency, etc.). As a result, network operators may enter into service level agreements where the network operators guarantee network performance with respect to the different priorities as service level requirements at or above a predefined value. As described herein, a scheduler may be configured to employ ML (e.g., a reinforcement learning agent) to determine resource allocations expected to satisfy different types of service level requirements. For example, a datacenter may employ a reinforcement learning agent to determine a policy expected to meet one or more types of service level requirements, and allocate resources with modulation and coding schemes to users on a per slot basis. For instance, the scheduler implementing the reinforcement learning agent may identify UEs and/or applications in need of scheduled resources, identify the service level requirements associated with the identified UEs and/or applications, determine state information (e.g., current channel conditions of each of the UEs, historical service level performance, etc.), and determine a plurality of assignments of scheduled resources expected to satisfy the service level requirements based on the policy and the state information. Accordingly, the systems, devices, and methods described herein provide techniques for employing a MLBS to meet varying technical objectives when sharing radio resources among a plurality of UEs and/or applications having different service level requirements in a wireless communication network.

Illustrative Environment

FIG. 1 is a diagram showing an example of a wireless communication system 100, in accordance with some aspects of the present disclosure.

As illustrated in FIG. 1, the wireless communication system 100 may include a datacenter system 102, one or more radio units (RUs) 104(1)-(n), and one or more user equipments (UEs) 106(1)-(n). The datacenter system 102 may be a cloud computing environment. For example, the datacenter system 102 may provide the UEs 106(1)-(n) with distributed storage and access to software, services, files, and/or data via a network, e.g., the Internet. Further, in some aspects, the datacenter system 102 may provide mobile edge computing (MEC) where certain functions of a mobile network can be provided as workloads on nodes in a cloud computing environment.

The RUs 104 may be configured to provide radio access (e.g., wireless network access) to the UEs 106(1)-(n). For example, the RUs 104 may comprise radio transmission points (e.g., a next generation Node Bs (gNBs), base stations or access points), which manage radio communications with the UEs 106(1)-(n). Further, in some aspects, the RUs 104 may facilitate access by the UEs 106(1)-(n) to the datacenter system 102. Some examples of the UEs 106 include smartphones and computing devices, Internet of Things (IoT) devices, drones, robots, process automation equipment, sensors, control devices, vehicles, transportation equipment, tactile interaction equipment, virtual and augmented reality (VR and AR) devices, industrial machines, etc. As illustrated in FIG. 1, in some aspects, a UE 106 may include one or more applications 108(1)-(n) configured to interface with the datacenter system 102 and other remote application servers, service providers, and/or resources.

As illustrated in FIG. 1, the datacenter system 102 may include a scheduler 110 configured to allocate resources 112 provided by the RUs 104 based on one or more service level agreements (SLAs) 114(1)-(n). In some aspects, the resource allocation process may be performed continuously in response to changing traffic conditions to optimize a radio access network (RAN) configuration to meet the SLAs 114. As used herein, the resources 112(1)-(n) may include physical radio resources in the time-frequency domain. In some aspects, a resource grid may be used to represent the frame structure of the resources 112(1)-(n). Further, each time slot may include a resource block (RB) (also referred to as physical RBs (PRBs)) that extends a predefined number of consecutive subcarriers. Further, the resource grid may be divided into multiple resource elements (REs). The number of bits carried by each RE may depend on the modulation scheme determined by the RUs 104. In addition, a resource block may be employed for an uplink communication or a downlink communication in a slot of a frame. Further, in some aspects, the scheduler 110 may be configured to allocate virtual resources (i.e., network slices). For example, the resources 112(1)-(n) may be partitioned into multiple blocks or segments each defined by one or more numerologies to meet certain communication requirements, such as low latency, wide coverage, etc. As used herein, in some aspect, "numerology" may refer to the values of the basic physical transmission parameters, particularly including, for example, the slot length, e.g., a time duration or number of symbols, wherein the slot length is shorter for higher numerologies.

As described herein, a "SLA" may refer to a contract between the provider of a service and a customer that defines what services the provider will offer and the level of performance it must meet as well as any remedies or penalties should the agreed-upon levels not be realized. In some aspects, SLAs typically establish customer expectations for a provider's performance and quality. Some examples of customers include consumers, businesses, enterprises, organizations, service providers, application developers, and the like. Further, the SLAs 114 may govern the level of service provided by the datacenter system 102 and/or the RUs 104 to the UEs 106(1)-(n). For example, the SLAs 114 may set forth the level of service provided to the one or more applications 108. In some aspects, the SLA terms may include metrics covering technical aspects of service, e.g., one or more terms describing a level and volume of communication services and which measure the performance characteristics of a provided service. Such technical metrics may include but not be limited to, for example, central processing unit (CPU) utilization, availability, data throughput, latency, bit/packet error rate, energy consumption/usage, etc. A SLA may also include business, economic, and legal terms covering the agreement between the service provider and the customer.

As described in detail herein, the scheduler 110 may use ML and/or pattern recognition techniques to allocate the resources 112 to the UEs 106. For instance, the scheduler 110 may operate based on a policy configured by a reinforcement learning agent of the scheduler 110. In some aspects, during a training phase, the reinforcement learning agent may be configured to allocate the resources 112 to the UEs 106 in a view of a constraint of an SLA 114. Each allocation may produce a new state of the wireless network, which may be evaluated in view of the constraint. The allocations that satisfy the constraint may be rewarded by the reinforcement learning agent, and used to determine a policy. The policy may represent the optimal actions to take to meet constraints (i.e., service level requirements) of the SLAs 114 in view of state information (e.g., historical state information, current state information, and/or predicted state information). Further, the scheduler 110 may be configured to determine a sequence of scheduled assignments of the RBs with a corresponding modulation coding scheme based on the policy that is expected to meet the requirements of the SLAs 114 associated with the UEs 106. In some aspects, the scheduler 110 may be configured to provide scheduled assignments based on a plurality of constraints from the different SLAs 114(1)-(n).

As an example, the UE 106 may be a mobile device executing an application 108(1) with videoconferencing functionalities. Further, a SLA 114(1) associated with the application 108(1) and/or the UE 106(1) may require the datacenter system 102 to provide throughput greater than or equal to a first predefined amount and latency below a second predefined amount. In addition, the UEs 106(1)-(n) may transmit a plurality of scheduling requests 116(1)-(n) to the scheduler 110. For example, the application 108(1) may transmit a scheduling request 116(1) to the scheduler 110 in order to be assigned a portion of the resources to transmit and/or receive videoconferencing data. In some aspects, the scheduling requests 116(1)-(n) may be transmitted by the UEs 106 over the physical uplink control channel (PUCCH) in uplink control information (UCI).

Further, the scheduler 110 may determine current state information for the UEs 106 and service level requirements for the UEs 106(1)-(n) based on the SLAs 114(1)-(n). For example, the scheduler 110 may determine historic and current state information associated with one or more channels used by the RU 104 and/or the UEs 106(1)-(n) for communications. In some aspects, the scheduler 110 may collect the state information via reporting information provided by the UEs 106(1)-(n) to the RU 104. Further, the scheduler 110 may identify the throughput latency requirements of SLA 114(1) based upon receipt of the scheduling requests 116(1), and one or more other service level requirements defined within the SLAs 114(2)-(n) for the other UEs 106(2)-(n). In some aspects, the scheduling request 116 may be received in response to a request from a UE 106 (e.g., when the UE 106 has data to transmit), or when the RU receives data for delivery to the UE (e.g., data transmitted by other UEs 106 or other computer devices across the network). As described herein, the service level requirements may be different types of service level requirements, e.g., the SLA 114(1) may have the throughput and latency requirements that must be met with respect to communications with the application 108(1) of the UE 106(1), and the SLA 114(2) may have a CPU utilization requirement that must be met with respect to communications with application 108(2) of the UE 106(2).

In addition, the scheduler 110 may determine a sequence of resource assignments 118(1)-(n) expected to meet the service level requirements based on the state information and the service level requirements. In some aspects, the sequence of resource assignments 118(1)-(n) may include a plurality of grants of a scheduled assignment of a resource and a modulation coding scheme to individual UEs of the plurality of UEs 106(1)-(N). For example, based upon an expected state of a first channel being sufficient to meet the throughput and latency requirements of the SLA 114(1) using a first RB of the resources 112 and an expected state of a second channel being sufficient to meet the CPU utilization requirements of the SLA 114(2) using a second RB of the resources, the scheduler 110 may allocate the first RB to the UE 106(1) and the second RB to the UE 106(2) within the sequence of resource assignments 118(1)-(n).

Further, the datacenter system 102 may transmit the sequence of resource assignments 118(1)-(n) to the UEs 106 via a control channel provided by an RU 104. In some aspects, the control channel may be the physical downlink control channel (PDCCH). Upon receipt of the sequence of resource assignments 118(1)-(n), each UE 106 that has received a grant of a scheduled assignment of the resource 112 may receive a DL transmission or transmit a UL transmission in accordance with the time-frequency associated with scheduled assignment and the corresponding modulation scheme. For example, the UE 106(1) may receive an UL grant within the sequence of resource assignments 118(1), and transmit UL data 120 from the application 108(1) during the particular slot of the resources 112 based on the UL grant. Alternatively, in some aspects, the UE 106(1) may receive a DL grant within the sequence of resource assignments 118(1), and receive data 120 for the application 108(1) during the particular slot of the resources 112 based on the DL grant. Further, in some aspects, the UE 106(1) may provide reporting information to the RU 104 indicating a current state during/after receipt or transmission of the data 120, and whether one or more service level requirements of the SLA 114(1) were met.

Figure 2A:
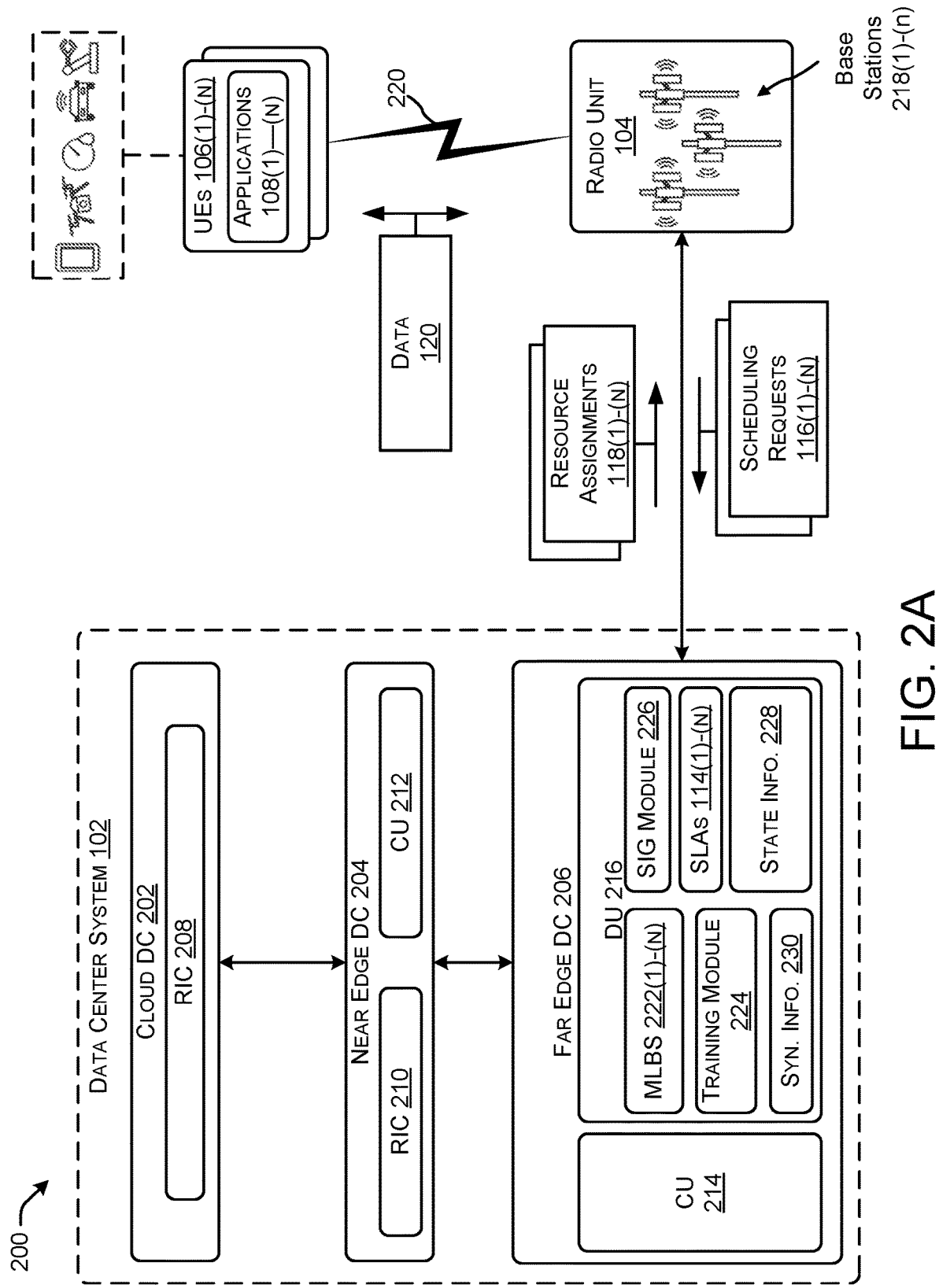
FIG. 2A illustrates an example architecture of a wireless communication system implementing a MLBS, in accordance with some aspects of the present disclosure.

FIG. 2A illustrates an example architecture of a wireless communication system 200 implementing a MLBS, in accordance with some aspects of the present disclosure. As illustrated in FIG. 2A, the wireless communication system 200 may include the datacenter system 102, the RUs 104 (1)-(N), and the plurality of UEs 106(1)-(N). Further, as illustrated in FIG. 2A, the datacenter system 102 may include a cloud DC 202, a near edge DC 204, and a far edge DC 206.

The central DC 102 may be a cloud DC. Further, the central DC 202 may include a RAN intelligent controller (RIC) 208. In some aspects, the RIC 208 may be a non-real-time RIC, and the RIC 208 may perform logical functions that enable non-real time control and optimization of RAN elements and resources, artificial (AI)/ML workflow including model training and updates, and policy-based guidance of application/features in a near-time RIC. The near edge DC 204 may include a RIC 210 and a central unit (CU) 212 configured to manage non-real-time, higher L2 and L3 functions. In some aspects the RIC 210 may be a real-time RIC, and the RIC 210 may perform logical functions that enable near real-time control and optimization of O-RAN elements and resources (e.g., CUs, Central Unit-Control Plane (CU-CP), distributed units (DUs), etc.). The far edge DC 106 may include a CU 214 configured to manage non-real-time, higher L2 and L3 functions, and a DU 216 configured to manage real-time layers 1 and 2 (L1 and L2) scheduling functions. In some aspects, the far-edge DC 106 may support multi-access edge computing functions. Further, as described herein, the RUs 104 may communicate with the CUs 212 and 214 via the DU 216. In an example, the DU 216 may provide higher network layer functionality for a RAN, such as radio link control (RLC) or packet data convergence protocol (PDCP) layer functions. As described herein, the RUs 104 may facilitate access to the CUs 212 and 214 for the UEs 106. In addition, the CUs 212 and 214, DU 216, RUs 104, or portions thereof, may each execute as a workload on nodes of a cloud-computing environment and/or in a given compute cluster thereof.

The RUs 104 may provide at least physical (PHY) and/or media access control (MAC) layers of a base station or other RAN, or virtual RAN (vRAN). For example, the RUs 104 may include one or more base stations 218 (next generation Node Bs (gNBs)), which handle radio communications with the UEs 106(1)-(n). A base station 218 may include macro-cells (high power cellular base station) or small cells (low power cellular base station). In addition to other functions, the base stations 218 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages.

Further, the wireless communication system 200 may include communication links 220 between the base stations 218 and the UEs 106(1)-(n). The communication links 220 may include uplink (UL) (also referred to as reverse link) transmissions from a UE 106 to a base station 218 or downlink (DL) (also referred to as forward link) transmissions from a base station 218 to a UE 106. The communication links 220 may use multiple-input and multiple-output (MIMO) antenna technology, including spatial multiplexing, beamforming, or transmit diversity. In addition, the base station 218 and the UE 106 may each include a plurality of antennas, such as antenna elements, antenna panels, or antenna arrays to facilitate the beamforming.

As illustrated in FIG. 2A, the DU 216 may include a plurality of MLBS instances 222(1)-(n) (e.g., one or more schedulers 110), a training module 224, a synthetic information generation module (SIG) 226, the SLAs 114, and state information 228. The plurality of MLBS instances 222(1)-(n) may be configured to periodically allocate the resources 112. In some aspects, each MLBS instance 222 may correspond to a particular virtual network slice and/or type of objective/constraint (i.e., type of service level requirement) of an SLA 114. As used herein, a "network slice" may correspond to a logical (i.e., virtual) network customized to serve a defined purpose, type/class of service, quality of services (QoS), or dedicated customers. For example, each network slice may occupy a subset of the resources 112, having a particular numerology, and correspond to one or more particular types of service level requirements and/or one or more applications 108. In some aspects, the frame structures of the radio resources in the time domain are 10 ms in length irrespective of the numerology in use but may vary in width in the frequency domain. For example, a first network slice may serve automotive services in a high mobility scenario and use a wider sub-carrier spacing to combat high Doppler shifts, while a second network slice may serve a latency-sensitive service such as real-time gaming and use fewer symbols in each sub-frame. In addition, the resources blocks of the first network slice may be allocated using a first MLBS instance 222(1), and the resource blocks of the second network slice may be allocated using a second MLBS instance 222(2).

Some network slices (e.g., 5G NR network slices) may include resources composed into an end-to-end service delivery construct. The resources may include physical resources, either a share or profile allocated to a slice, or dedicated physical resources in some cases. Network slices may also include logical entities such as configured network functions, management functions, VPNs (virtual private networks), etc. In some aspects, the resources 112 (physical or logical) can be dedicated to a 5G network slice, i.e., separate instances, or they may be shared across multiple slices. Network slicing allows the 5G NR network operator to provide dedicated logical networks (i.e., network slices) with customer specific functionality. The 5G NR architecture enables different network configurations in different network slices.

For example, the International Telecommunication Union Radio communication Sector (ITU-R M. 2083-0) envisions usage scenarios for 5G networks that include: Mobile Broadband (MBB), Ultra-Reliable and Low Latency Communications (URLLC); and Massive Machine Type Communications (MMTC). The MBB usage scenario addresses the human-centric use cases for access to multi-media content, services, and data. The URLLC usage scenario may typically have relatively stringent requirements for capabilities such as latency, and availability. Some examples include wireless control of industrial manufacturing or production processes, remote medical surgery, distribution automation in a smart grid, transportation safety, etc. The MMTC usage scenario may be characterized by a very large number of connected devices such as Internet of Things (IoT) devices. Further, in some aspects, a MLBS instance 222 and/or a network slice may correspond to a one or more particular usage scenarios.

Further, the training module 224 may be configured to generate and train the individual MLBS instances 222(1)-(n) to allocate the resources 112 in accordance with a type of objective or constraint of an SLA 114. In some aspects, the training module 224 may employ a reinforcement learning agent to train each MLBS instance 222 to meet at least one type of constraint or objective of an SLA 114. For example, during a training process, a MLBS instance 222 may receive an objective (e.g., a type of service level requirement) and generate a policy for accomplishing the objective via a sequence of actions. In particular, the MLBS instance 222 may continuously receive state information 228, determine a plurality of actions to take with respect to the resources 112 (i.e., allocate RBs to individual UEs 106), and receive rewards for the actions (i.e., resource assignments) that satisfy the objective by causing a subsequent state that meets or exceeds the objective. Further, the MLBS instance 222 may determine a policy of actions to perform to meet the objective with respect to particular state information based on the rewards. In some examples, the state information 228 may include historical throughput to the UEs 106, a historical latency of the UEs 106, one or more channel conditions of the channels between the UEs 106 and the base stations 218, historic RAN CPU utilization of the UEs 106, historic performance with respect to the SLA terms, historic deviation from the SLAs 114, etc. Further, each MLBS instance 222 may use a corresponding policy to determine the sequence of resource assignments 118(1)-(n).

In some aspects, the training module 224 may employ synthetic information 230 to train the MLBS instances 222(1)-(n). For example, the synthetic information generation module 226 may simulate wireless network data (i.e., the synthetic information 230), and the training module 224 may use the simulated wireless network data to train the MLBS instances 222(1)-(n). Some examples of the simulated wireless network data include throughput information, a latency information, channel conditions, RAN CPU utilization information, and/or SLA term performance, and/or deviation from the SLAs 114. Further, in some aspects, the synthetic information generation module 226 may generate the simulated wireless network data to correspond to a plurality of environments (e.g., urban environments, industrial environments, rural environments, etc.), mobility contexts, and/or use cases (e.g., usage scenarios). For example, the synthetic information generation module 226 may employ a ray tracing propagation model to generate synthetic channel state data (e.g., channel state information (CSI)) representing a plurality of environments, mobility contexts, and/or use cases. Additionally, or alternatively, the training module 224 may collect state information 228 prior to and during the training process. For example, the training module may collect CSI from the UEs 106. The CSI may report dynamic channel conditions between the UE 106 and the base station 218, such as the CQI (channel quality indicator), the PMI (precoding matrix indicator) with different codebook sets, and the rank indicator (RI). In some aspects, the UEs 106 may determine the CSI by measuring a CSI reference signal (CSI-RS) received from a base station 218. The CSI-RS is transmitted by the base station 218 as a known reference signal which a UE 106 measures and then reports the radio channel properties back to the base station 218. Channel conditions are typically reasonably stable with completely stationary UE 106. With limited changes in multipath propagation, most channel variations should come from interference from other cells or UE 106. However, mobile UEs 106 may experience vastly different and rapidly changing radio conditions, especially as they may move in and out of line of sight to the base station 218. When the base station 218 receives the CSI parameters from the UE 106, it can use the CSI parameters to train the MLBS instances 222(1)-(n) and/or as state information 228 to schedule the resource allocation (such as modulation scheme, code rate, number of transmission layers, and MIMO precoding).

Further, in some aspects, the training module 224 may update or retrain the MLBS instances 222(1)-(n). For example, in some aspects, a MLBS instance 222 may initially correspond to a particular type of environment, service level requirement, and/or application 108, and not be specifically trained for the geographic location of the RU 104. Further, once the MLBS instance 222 is deployed, the DU 216 may collect state information 228 particular to the geographic location and update the policy of the MLBS instance 222 based on the state information 228. In some aspects, the state information 228 particular to the geographic location may capture the characteristics of the particular wireless environment (e.g., obstructions, load, etc.), mobility contexts of the UEs 106 relying on the RUs 104, and/or use cases for the wireless services provided by the RU 104 to the UEs 106. As such, the update to the MLBS instances 222 may fine tune the policy for allocating resources within the geographic location of the RU 104.

Further, as described herein, once the one or more MLBS instances 222 are trained and deployed within a DU 216, the one or more MLBSs instances 222 may allocate the resources to the UEs 106(1)-(n). In particular, a MLBS instance 222 may receive the scheduling requests 116(1)-(n), and periodically determine sequence of resource assignments 118(1)-(n) expected to meet the service level requirements associated with the UEs 106 in view of the state information 228, the SLAs 114(1)-(n), and the scheduling requests 116(1)-(n). In some aspects, each MLBS instance 222 may be used for a particular virtual network slice in a vRAN implementation. For example, the first MLBS instance 222(1) may be used to allocate resources 112 within a first network slice for high mobility use cases where UEs 106 are more likely to have poor channel conditions, and the second MLBS instance 222(2) may be used to allocate resources 112 within a second network slice for low latency use cases where UEs 106 need a plurality of consecutive grants of a scheduled assignment of the resource.

Figure 2B:
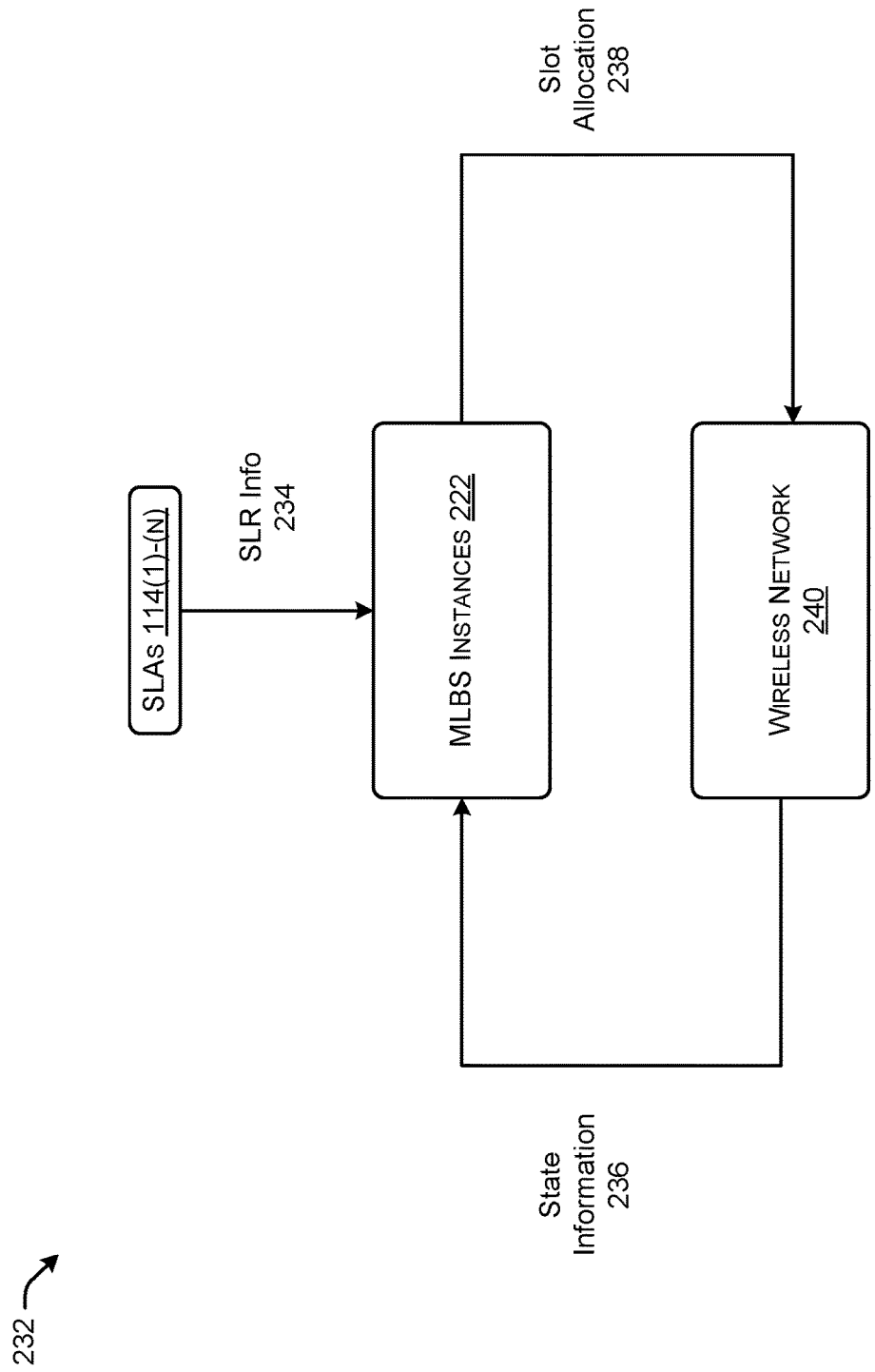
FIG. 2B is a diagram showing an example method for configuring a MLBS, in accordance with some aspects of the present disclosure.

FIG. 2B is a diagram 232 showing an example method for configuring a MLBS, in accordance with some aspects of the present disclosure. During a training or re-training phase managed by the training module 224, a MLBS instance 222(1) of the plurality of MLBS instances 222(1)-(n) may receive service level requirement (SLR) information 234 of a SLA 114(1). The SLR information 234 may include a type of a service level requirement and at least one predefined value that should be met for the service level requirement. As an example, the type of a service level requirement may be "throughput objective," and applied to ensure that communications by a UE 106 have throughput above the predefined value. As another example, the type of a service level requirement may be "latency constraint," and is applied to ensure that the latency for communications by the UE 106 are below the predefined value.

Further, the MLBS instance 222(1) may receive state information 236 and allocate a resource block with a modulation coding scheme to one of the UEs 106(1)-(n) (e.g., the UE 106(1) within a slot allocation 238 based on the state information 236. Further, the slot allocation 238 may be transmitted to the UE 106(1) via the wireless network 240, and cause a new state for the UE 106(1). The UE 106(1) may measure the new state and provide the measured information to the MLBS instance 222(1) within the state information 236. For example, the UE 106(1) may provide a throughput measurement or latency measurement over a period of time to the MLBS instance 222(1). The MLBS instance 222(1) may compute a reward for performing the slot allocation 238 with respect to the service level requirement, e.g., determine the degree to which the slot allocation 238 satisfied the service level requirement. In addition, the MLBS instance 222(1) may be trained to maximize the reward value over a plurality of slot allocations 238 to determine a policy, which maps a current state (e.g., channel conditions) to a slot allocation that is expected to meet the type of service level requirement.

Figure 3A:
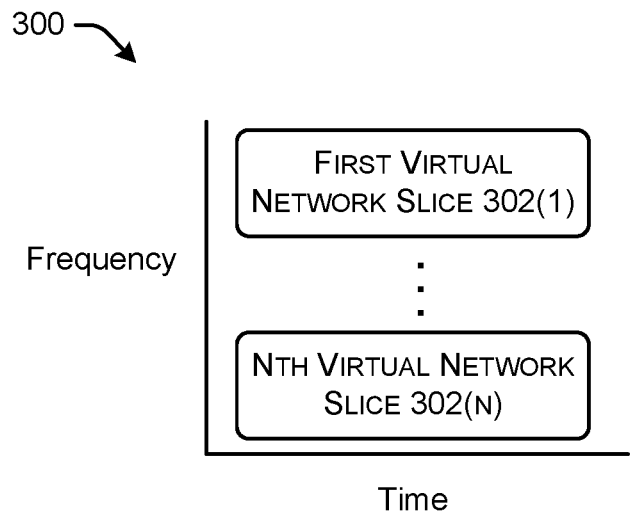
FIG. 3A illustrates segmenting of physical radio resources among a plurality of network slices, in accordance with some aspects of the present disclosure.

FIG. 3A is a diagram 300 illustrates segmenting physical radio resources among a plurality of network slices, in accordance with some aspects of the present disclosure. More specifically, the physical radio resource (e.g., the resources 212(1)-(n)) are partitioned into a plurality of network slices 302(1)-(n) each defined by one numerology to meet certain communication requirements, such as low latency, wide coverage, etc. In some aspects, each RAN portion of a network slice occupies a subset of physical resources taken from one or multiple numerology segments which may be represented, as shown in FIG. 3A, using dimensions comprising frequency and time. As described above, in 5G NR, frame structures of the radio resources in the time domain are 10 ms in length irrespective of the numerology in use but may vary in width in the frequency domain. For example, a RAN slice serving automotive services in a high mobility scenario may use a wider subcarrier spacing to combat high Doppler shifts, while a RAN slice serving a latency-sensitive service such as real-time gaming may use fewer symbols in each sub-frame.

Figure 3B:
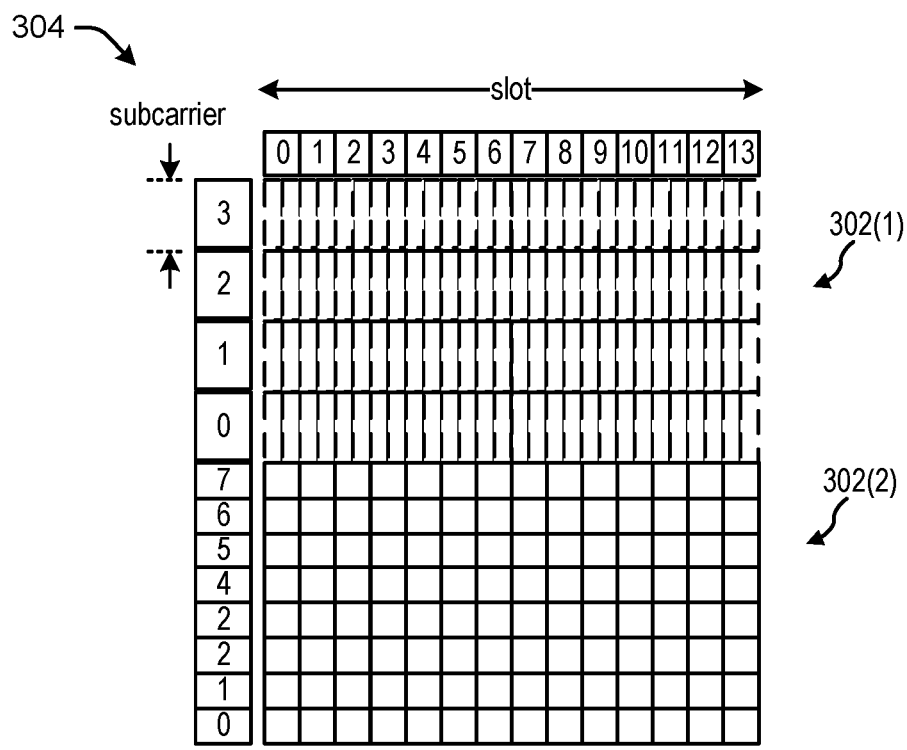
FIG. 3B illustrates an example of a plurality of network slices having different numerologies, in accordance with some aspects of the present disclosure.

FIG. 3B is a diagram 304 illustrates an example of a plurality of network slices having different numerologies, in accordance with some aspects of the present disclosure. As illustrated in FIG. 3B, a first network slice 302(1) may have a first numerology (e.g., 4*360 kilohertz), and a second network slice 302(2) may have a second numerology (e.g., 8*180 kilohertz). Further, as described in detail herein, a first MLBS instance 222(1) may allocate the resources of the first network slice 302(1) based upon one or more first of service level requirement types, and a second MLBS instance 222(2) may allocate the resources of the second network slice 302(2) based upon one or more second service level requirement types.

Figure 4:
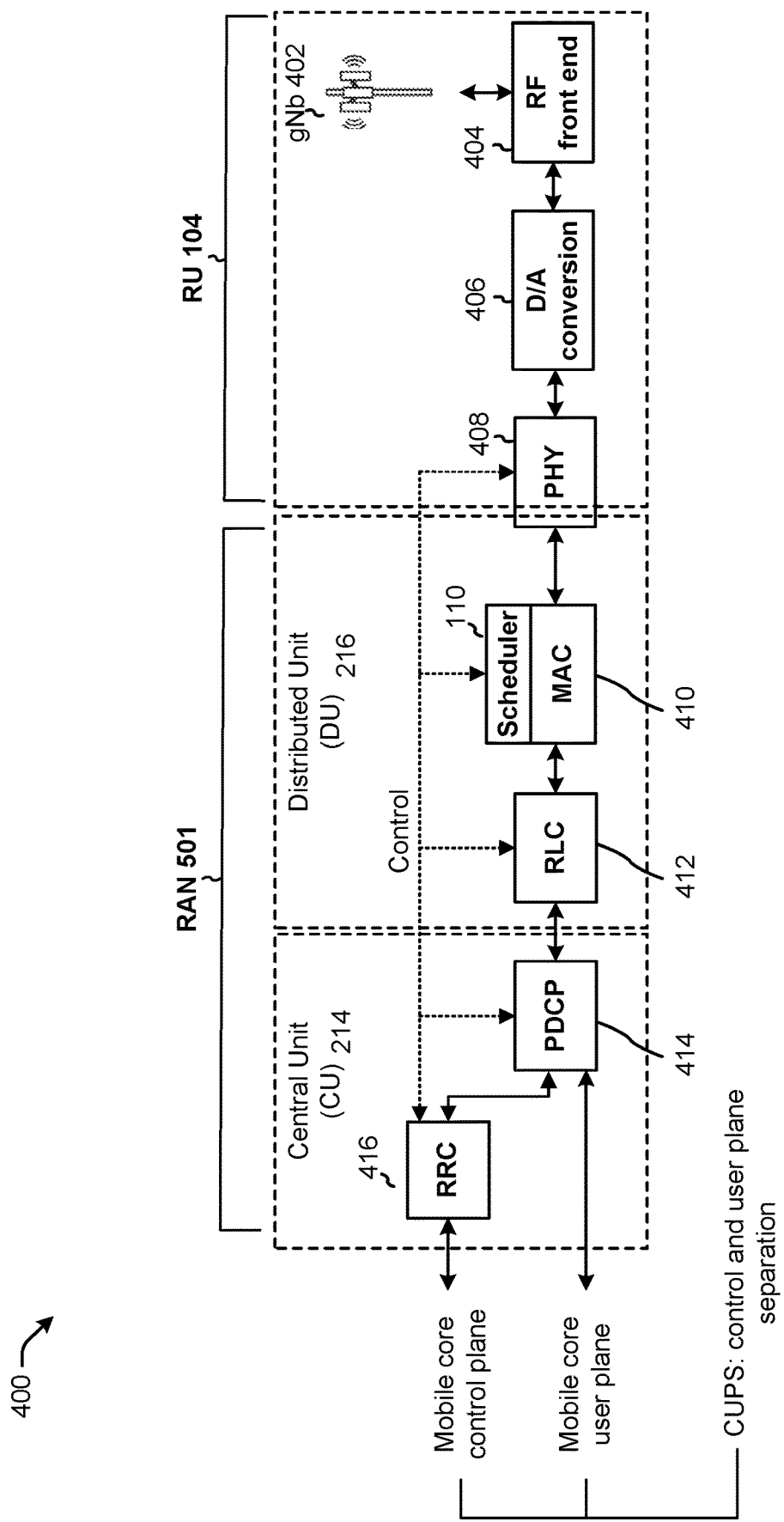
FIG. 4 is a diagram illustrating functional blocks of a radio access network (RAN) and a radio unit (RU), in accordance with some aspects of the present disclosure.

FIG. 4 is a diagram 400 illustrating functional blocks of the RAN 401 and RU 104, in accordance with some aspects of the present disclosure. The RU 104 comprises radio transmission points, for example, a next generation Node B, gNB 402, which handles radio communications with a UE (e.g., the UE 106(1)). The gNB 402 is serially coupled with a radio frequency (RF) front end 404, a digital to analog (D/A) conversion unit 406, and a portion of the functionality of the physical (PHY) layer 408 as described in the OSI Open Systems Interconnection model. Under 3GPP and O-RAN (Open RAN) Alliance, the processing pipeline of the RAN 401 is split into a DU 216, and a CU 214. The DU 216 is responsible for real-time layers 1 and 2 (L1 and L2) scheduling functions, and the CU 214 is responsible for non-real-time, higher L2 and L3 functions. Accordingly, the DU 216 comprises a scheduler 110 (e.g., a MLBS instance 222) located on top of a MAC (Medium Access Control) layer 410, an RLC (radio link control) layer component 412, and parts of a PHY (physical) layer 408. The MAC layer 410 is responsible for buffering, multiplexing and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation. The CU 214 is configured with a PDCP (Packet Data Convergence Protocol) layer 414 and RRC layer 416. The PDCP layer 414 is responsible for compressing and decompressing IP headers, ciphering and integrity protection, and making an "early" forwarding decision (i.e., whether to send the packet down the pipeline to the UE or forward it to another base station). The RRC layer 416 is responsible for configuring the coarse-grain and policy-related aspects of the RAN processing pipeline. The RRC layer 416 interfaces with the mobile core control plane while the PDCP layer 414 interfaces with the user plane to thereby implement the control and user plane separation (CUPS) feature of 5G.

Figure 5:
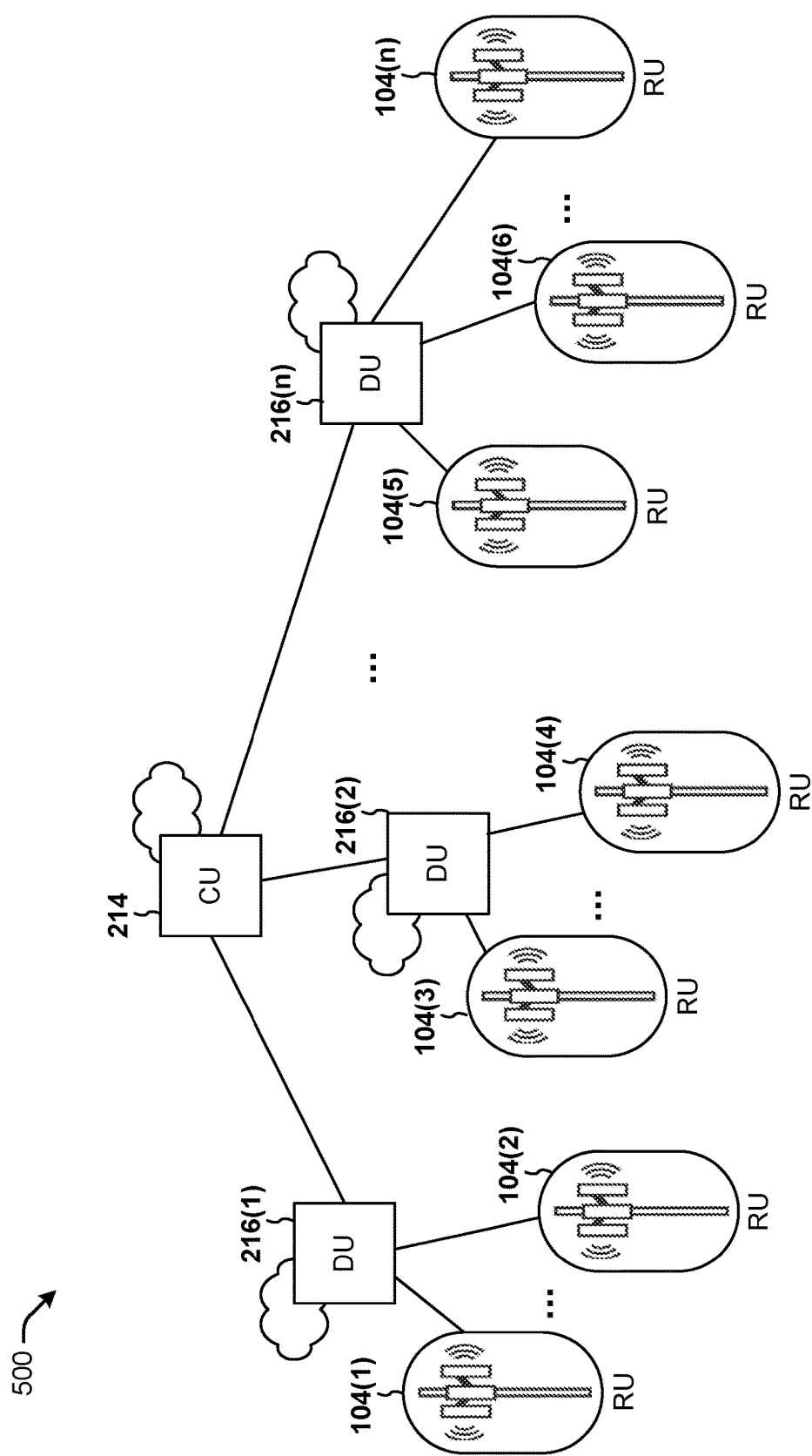
FIG. 5 is a diagram illustrating an example 5G NR RAN and an RU, in accordance with some aspects of the present disclosure.

FIG. 5 is a diagram 500 illustrating an example 5G wireless communication network. Further, the split-RAN configuration shown in FIG. 5 enables RAN functionality to be split among physical infrastructure elements in centralized and distributed locations. For example, as shown in FIG. 5, a single CU 214 may be configured to serve multiple DUs 216, each of which in turn serves multiple RUs 104. Further, as described in detail herein, a DU 216 may be configured to perform resource block scheduling for each of the RUs 104 that the DU 216 serves.

Example Process

The processes described in FIG. 6 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the DU 216. By way of example and not limitation, the method 600 is described in the context of FIGS. 1-5 and 7-10. For example, the operations may be performed by one or more of the scheduler 110, MLBS instances 222(1)-(n), the training module 224, and/or the synthetic information generation module 226.

FIG. 6 is a flow diagram illustrating an example method 600 for employing a resource block scheduler using ML in the presence of varying and uncertain channel conditions, in accordance with some aspects of the present disclosure.

At block 602, the method 600 may optionally include receiving a plurality of scheduling requests each associated with a respective application of a plurality of applications on a plurality of wireless devices. For example, the MLBS instance 222 may receive the scheduling requests 116 from the plurality of UEs 106 or a RU 104 may receive data for delivery to a UE 106 served by the RU 104. In some aspects, the plurality of UEs 106 may transmit the scheduling requests 116(1)-(n) to the DU 216 via a control channel provided by the radio unit 104(1).

Accordingly, the DU 216, the server 901, and/or the host processor 907 executing the MLBS instance 222 may provide means for receiving a plurality of scheduling requests each associated with one of a plurality of wireless devices.

At block 604, the method 600 may include identifying a plurality of current channel state information each associated with one of the plurality of wireless devices. For example, the MLBS instance 222 may determine current channel state for the plurality of UEs 106. In some aspects the MLBS instance 222 may determine the plurality of current channel state information from reporting information periodically received from the plurality of UEs via the RU 104.

Accordingly, the DU 216, the server 901, and/or the host processor 907 executing the MLBS instance 222 may provide means for identifying a plurality of current channel state information each associated with one of the plurality of wireless devices.

At block 606, the method 600 may include identifying a plurality of different types of service level requirements each associated with one of the plurality of applications. For example, MLBS instance 222 may determine the service level requirements of each SLA 114 associated with the UEs 106(1)-(n). In some aspects, each of the plurality of scheduling requests and a corresponding one of each of the plurality of different types of service level requirements are associated with a respective application on the plurality of wireless devices. In some aspects, the plurality of different types of service level requirements include at least one of central processing unit (CPU) utilization requirements, data throughput requirements, energy usage requirements, bit error rate requirements, packet error rate requirements, latency requirements, or a permitted deviation from at least one of the plurality of different types of service level requirements.

Accordingly, the DU 216, the server 901, and/or the host processor 907 executing the MLBS instance 222 may provide means for identifying a plurality of different types of service level requirements each associated with one of the plurality of applications.

At block 608, the method 600 may include determining, by a MLBS based on each of the plurality of current channel state information, a sequence of resource assignments expected to meet the plurality of different types of service level requirements, the sequence of resource assignments including a plurality of grants of a scheduled assignment of a resource and a modulation coding scheme to each of the plurality of applications. For example, the MLBS instance 222 may determine a sequence of resource assignments 118(1)-(n) expected to meet the service level requirements based on the current state information. In some aspects, the sequence of resource assignments 118(1)-(n) may include a plurality of grants of a scheduled assignment of a resource and a modulation coding scheme to each respective application of the plurality of UEs 106(1)-(N). For example, based upon an expected state of a channel being sufficient to meet the throughput requirements of the SLA 114(1) of a respective application during a particular slot of the resources 112, the MLBS instance 222 may allocate a resource block to the respective application on the UE 106(1). In some aspects, the resource may be a resource block for an uplink communication or a downlink communication in a slot of a frame for use by the respective application.

Accordingly, the DU 216, the server 901, and/or the host processor 907 executing the MLBS instance 222 may provide means for determine, by a machine learning based scheduler (MLBS) based on each of the plurality of current channel state information, a sequence of resource assignments expected to meet the plurality of different types of service level requirements, the sequence of resource assignments including a plurality of grants of a scheduled assignment of a resource and a modulation coding scheme to each of the plurality of applications.

At block 610, the method 600 may include transmitting respective ones of the plurality of grants for the plurality of applications to the plurality of wireless devices. For example, the MLBS instance 222 may transmit the sequence of resource assignments 118(1)-(n) to respective applications on the UEs 106(1)-(n). In some aspects, the MLBS instance 222 may transmit a UL grant to a respective application on the UE 406(1) via a control channel (e.g., PDCCH) provided by the RU 104.

Accordingly, the DU 216, the server 901, and/or the host processor 907 executing the MLBS instance 222 may provide means for transmitting respective ones of the plurality of grants for the plurality of applications to the plurality of wireless devices.

In additional aspect, in order to determining the sequence of resource assignments, the method 600 may include assigning, via each scheduled assignment, each resource to each of the plurality of applications in order to meet the plurality of different types of service level requirements over a period of time based on historical constraint information (i.e., information indicating whether network performance has deviated from the service level guarantees). In an alternative or additional aspect, wherein the sequence of resource assignments includes a first grant of a first scheduled assignment of a first resource having a first numerology to a first application of the plurality of applications, and a second grant of a second scheduled assignment of a second resource having a second numerology to a second application of the plurality of applications.

In an alternative or additional aspect, the MLBS is a first MLBS, the modulation coding scheme is a first modulation coding scheme, and the method 600 further includes receiving a scheduling request associated with another wireless device different from the plurality of wireless devices, identifying current channel state information associated with the another wireless device, identifying a service level requirement associated with the another wireless device, the service level requirement corresponding to a second MLBS of a second virtual network slice having a different numerology than a first virtual network slice corresponding the first MLBS, determining, by the second MLBS based on at least the current channel state information, a second sequence of resource assignments expected to meet at least the service level requirement, the second sequence of resource assignments including a grant of a scheduled assignment of the resource and a second modulation coding scheme to the another wireless device, and transmitting, via the control channel, the grant to the another wireless device. In an alternative or additional aspect, in order to determine the sequence of resource assignments, the method 600 further includes predicting, via the MLBS, a plurality of expected channel state information based on the plurality of current channel state information, the plurality of expected channel state information each associated with one of the plurality of wireless devices, and determining, by a reward policy of a reinforcement learning agent of the MLBS, the sequence of resource assignments expected to meet the plurality of different types of service level requirements based on the plurality of expected channel state information. In an alternative or additional aspect, the method 600 further includes generating synthetic state data representing a plurality of wireless environments and/or mobility contexts, and training the reward policy via the synthetic state data. In an alternative or additional aspect, the method 600 further includes generating, via a ray tracing propagation model, synthetic channel state data representing a plurality of wireless environments and/or mobility contexts, and training the reward policy via the synthetic channel state data. In an alternative or additional aspect, the method 600 further includes collecting training information corresponding to an environmental condition or usage context of the base station, and updating the reward policy via the training information.

While the operations are described as being implemented by one or more computing devices, in other examples various systems of computing devices may be employed. For instance, a system of multiple devices may be used to perform any of the operations noted above in conjunction with each other. For example, a car with an internal computing device along with a mobile computing device may be employed in conjunction to perform these operations.

Illustrative Computing Device

Figure 7:
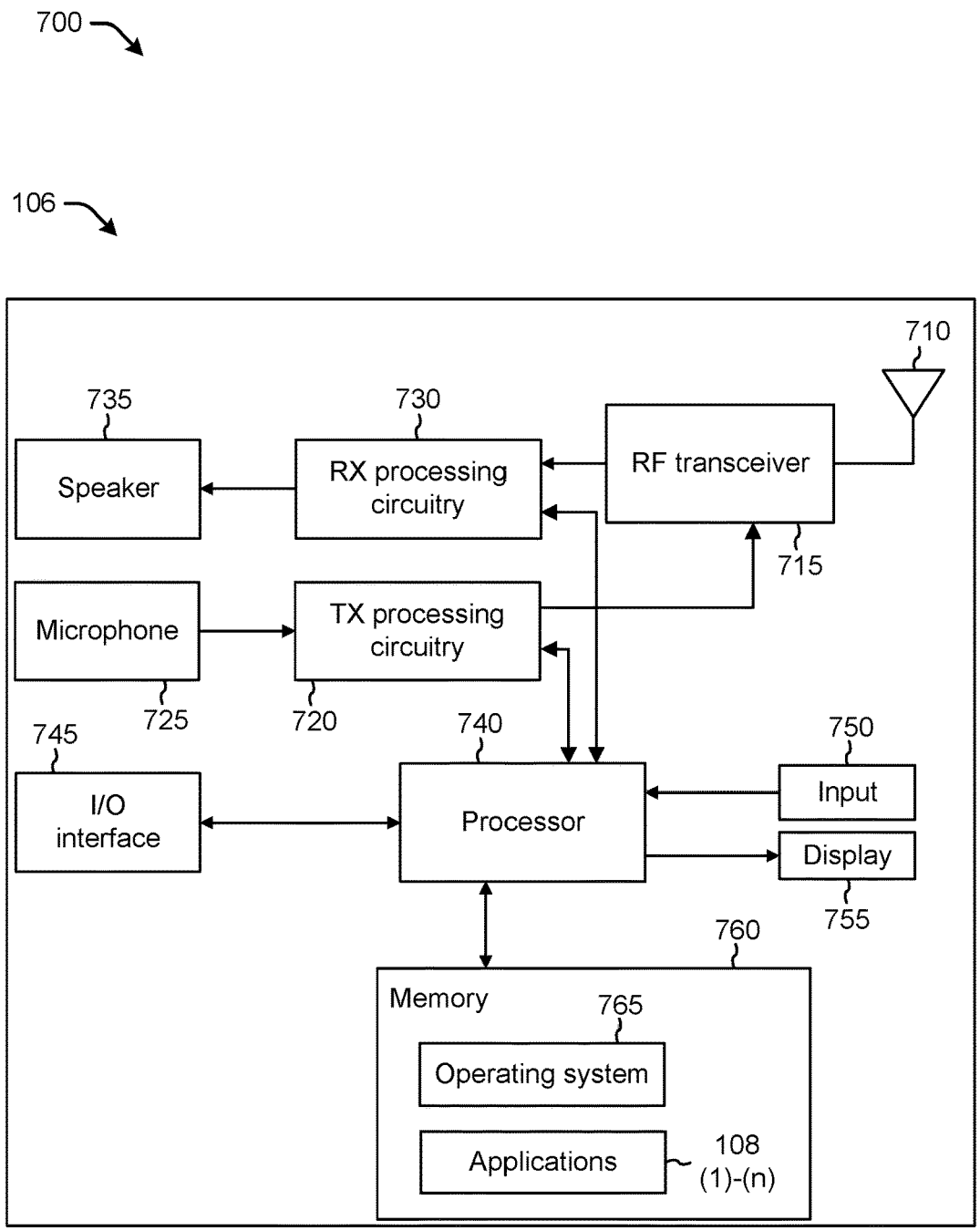
FIG. 7 is a block diagram illustrating an example of a hardware implementation for a UE, in accordance with some aspects of the present disclosure.

FIG. 7 is a block diagram 700 of an illustrative UE, in accordance with some aspects of the present disclosure. The embodiment of the UE 106 shown in FIG. 7 is for illustration only, and the UEs 106 shown in the drawings and described in the preceding text may have the same or similar configuration. However, it is noted that UEs may come in a wide variety of configurations, and FIG. 7 does not limit the scope of the present disclosure to any particular implementation of a UE.

The UE 106 includes an antenna 710, a radio frequency (RF) transceiver 715, transmit (TX) processing circuitry 720, a microphone 725, and receive (RX) processing circuitry 730. The UE 106 also includes a speaker 735, a processor 740, an input/output (I/O) interface 745, an input device 750, a display 755, and a memory 760. The memory includes an operating system (OS) program 765 and one or more applications 108.

The RF transceiver 715 receives from the antenna 710, an incoming RF signal transmitted by a gNB of a 5G network. The RF transceiver down-converts the incoming RF signal to generate an intermediate frequency (IF) or baseband signal. The IF or baseband signal is sent to the RX processing circuitry 730, which generates a processed baseband signal by filtering, decoding, and/or digitizing the baseband or IF signal. The RX processing circuitry transmits the processed baseband signal to the speaker 735 (such as for voice data) or to the processor 740 for further processing (such as for web browsing data).

The TX processing circuitry 720 receives analog or digital voice data from the microphone 725 or other outgoing baseband data (such as web data, e-mail, or interactive video game data) from the processor 740. The TX processing circuitry 720 encodes, multiplexes, and/or digitizes the outgoing baseband data to generate a processed baseband or IF signal. The RF transceiver 715 receives the outgoing processed baseband or IF signal from the TX processing circuitry and up-converts the baseband or IF signal to an RF signal that is transmitted via the antenna.

The processor 740 can include one or more processors or other processing devices and execute the OS program 765 stored in the memory 760 to control the overall operation of the UE 106. For example, the processor may control the reception of forward channel signals and the transmission of reverse channel signals by the RF transceiver 715, the RX processing circuitry 730, and the TX processing circuitry 720 in accordance with well-known principles. In some embodiments, the processor 740 includes at least one microprocessor or microcontroller.

The processor 740 may be configured for executing other processes and programs resident in the memory 760, such as operations for CSI measurement and reporting for systems described in embodiments of the present disclosure. The processor can move data into or out of the memory as required by an executing process. In some embodiments, the processor may be configured to execute the applications 108 based on the OS program 765 or in response to signals received from gNBs or an operator. The processor is also coupled to the I/O interface 745, which provides the UE 106 with the ability to connect to other computing devices such as laptop computers and handheld computers. The I/O interface may thus function as a communication path between such accessories and the processor.

The processor 740 is also coupled to the input device 750 (e.g., keypad, touchscreen, buttons etc.) and the display 755. A user of the UE 106 can typically employ the input device to enter data into the UE. For example, the display can be a liquid crystal display or other display capable of rendering text and/or graphics, video, etc., from web sites, applications and/or service providers.

The memory 760 is coupled to the processor 740. Part of the memory may include a random access memory (RAM), and another part of the memory may include a Flash memory or other read-only memory (ROM).

As described in more detail below, the UE 106 can perform signaling and calculation for CSI reporting. Although FIG. 7 shows one illustrative example of UE 106, it may be appreciated that various changes may be made to the drawing. For example, various components may be combined, further subdivided, or omitted and additional components may be added according to particular needs. As a particular example, the processor 740 may be divided into multiple processors, such as one or more central processing units (CPUs) and one or more graphics processing units (GPUs). Also, while FIG. 7 depicts the UE 106 as configured as a mobile device, such as a smartphone, UEs may be configured to operate as other types of portable or stationary devices.

Figure 8:
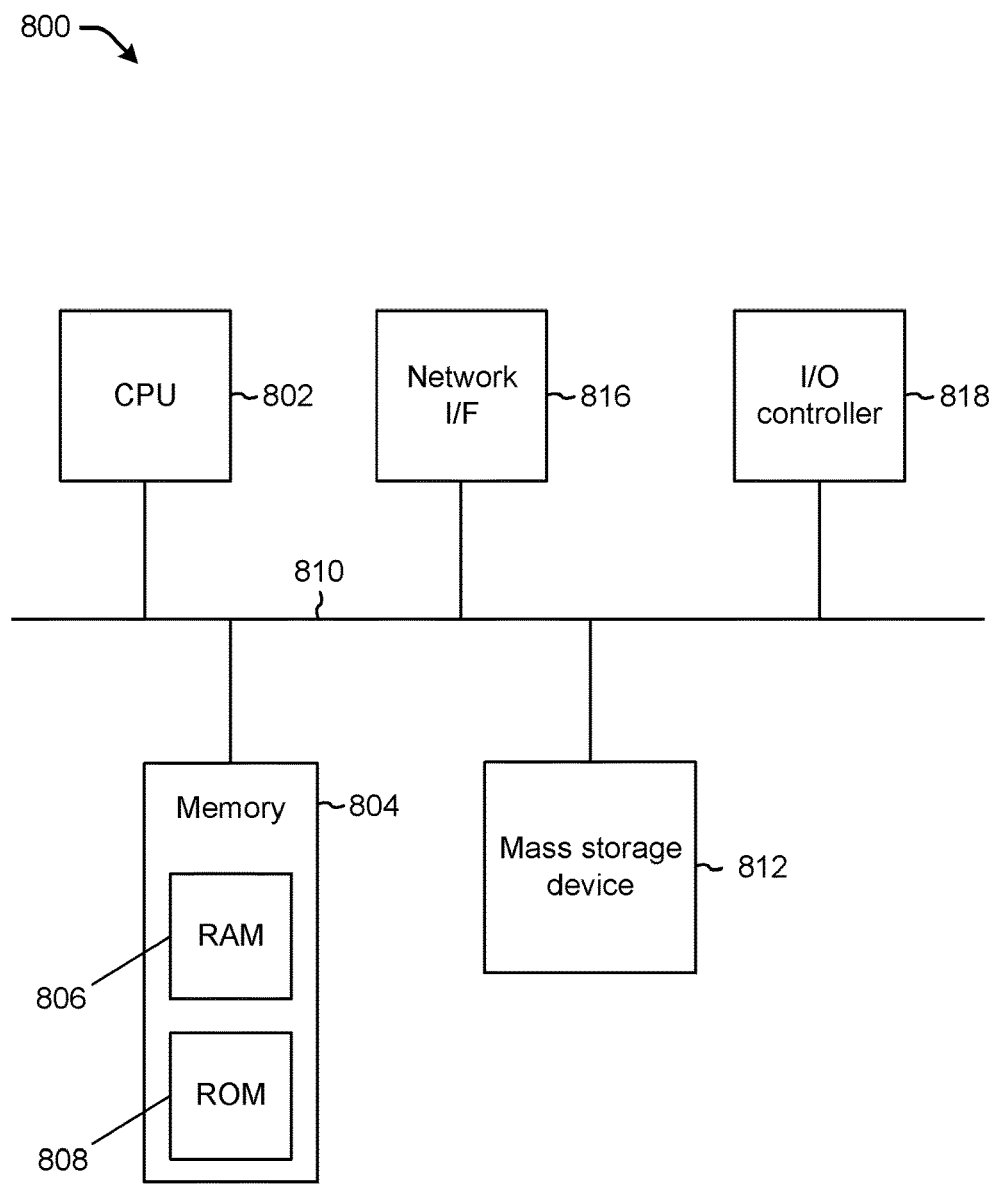
FIG. 8 is a block diagram illustrating an example of a hardware implementation for a server or computing device, in accordance with some aspects of the present disclosure.

FIG. 8 shows an illustrative architecture 800 for a computing device, such as a server that may form at least a part of datacenter system 102 (FIG. 1) implementing the scheduler 110 (FIG. 1) and/or MLBS instances 222(1)-(n) (FIG. 2A), in accordance with some aspects of the present disclosure. The architecture 800 illustrated in FIG. 8 includes one or more processors 802 (e.g., central processing unit, dedicated AI chip, graphics processing unit, etc.), a system memory 804, including RAM (random access memory) 806 and ROM (read only memory) 808, and a system bus 810 that operatively and functionally couples the components in the architecture 800. A basic input/output system containing the basic routines that help to transfer information between elements within the architecture 800, such as during startup, is typically stored in the ROM 808. The architecture 800 further includes a mass storage device 812 for storing software code or other computer-executed code that is utilized to implement applications, the file system, and the operating system. The mass storage device 812 is connected to the processor 802 through a mass storage controller (not shown) connected to the bus 810. The mass storage device 812 and its associated computer-readable storage media provide non-volatile storage for the architecture 800. Although the description of computer-readable storage media contained herein refers to a mass storage device, such as a hard disk or CD-ROM drive, it may be appreciated by those skilled in the art that computer-readable storage media can be any available storage media that can be accessed by the architecture 800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 800.

According to various embodiments, the architecture 800 may operate in a networked environment using logical connections to remote computers through a network. The architecture 800 may connect to the network through a network interface unit 816 connected to the bus 810. It may be appreciated that the network interface unit 816 also may be utilized to connect to other types of networks and remote computer systems. The architecture 800 also may include an input/output controller 818 for receiving and processing input from a number of other devices, including a keyboard, mouse, touchpad, touchscreen, control devices such as buttons and switches or electronic stylus (not shown in FIG. 8). Similarly, the input/output controller 818 may provide output to a display screen, user interface, a printer, or other type of output device (also not shown in FIG. 8).

It may be appreciated that the software components described herein may, when loaded into the processor 802 and executed, transform the processor 802 and the overall architecture 800 from a general-purpose computing system into a special-purpose computing system customized to facilitate the functionality presented herein. The processor 802 may be constructed from any number of transistors or other discrete circuit elements, which may individually or collectively assume any number of states. More specifically, the processor 802 may operate as a finite-state machine, in response to executable instructions contained within the software modules disclosed herein. These computer-executable instructions may transform the processor 802 by specifying how the processor 802 transitions between states, thereby transforming the transistors or other discrete hardware elements constituting the processor 802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 800 in order to store and execute the software components presented herein. It also may be appreciated that the architecture 800 may include other types of computing devices, including wearable devices, handheld computers, embedded computer systems, smartphones, PDAs, and other types of computing devices known to those skilled in the art. It is also contemplated that the architecture 800 may not include all of the components shown in FIG. 8, may include other components that are not explicitly shown in FIG. 8, or may utilize an architecture completely different from that shown in FIG. 8.

Figure 9:
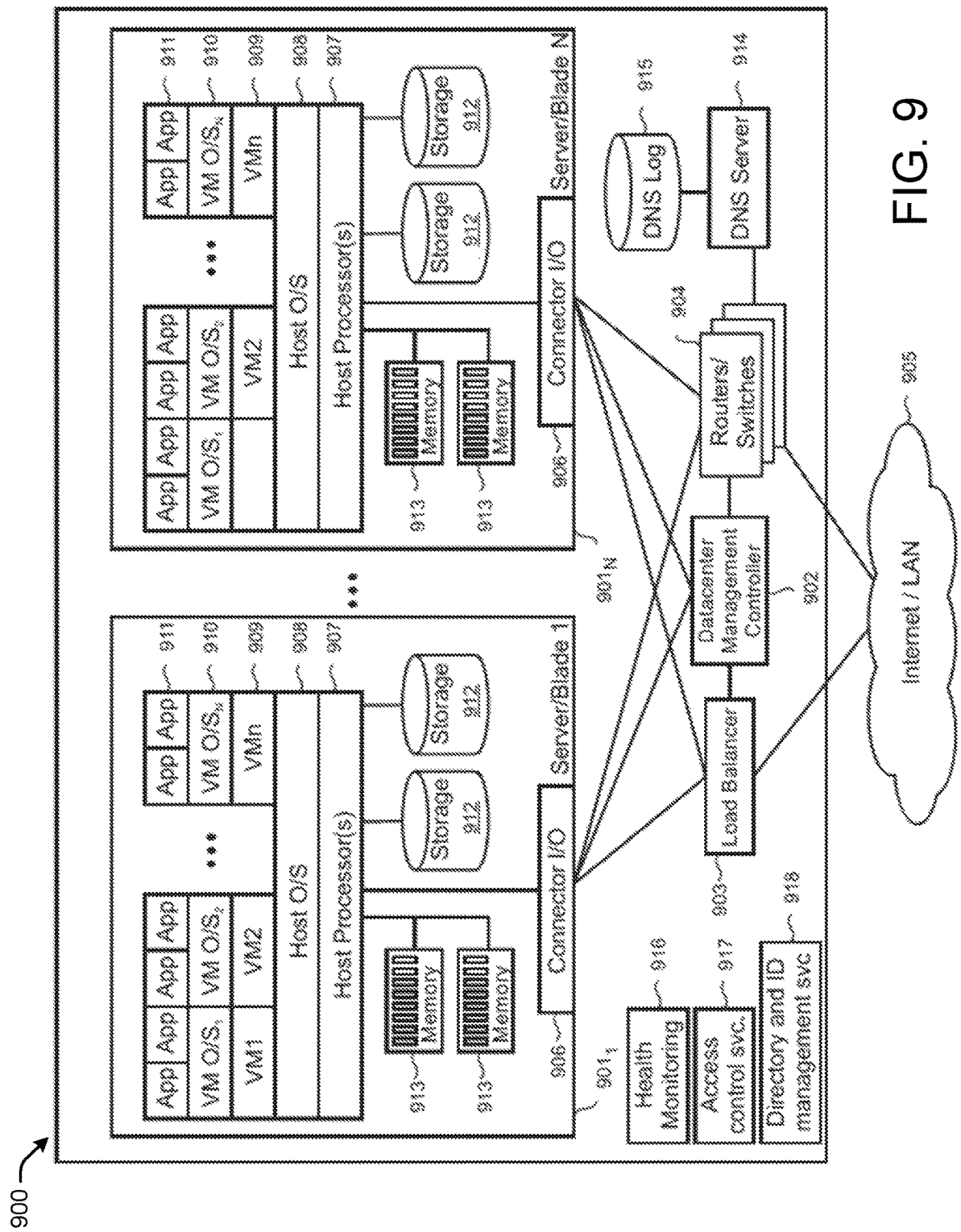
FIG. 9 is a block diagram illustrating an example of a hardware implementation for a datacenter, in accordance with some aspects of the present disclosure.

FIG. 9 is a block diagram illustrating an example of a hardware implementation for a datacenter, in accordance with some aspects of the present disclosure. Datacenter 900 may incorporate the features disclosed in FIGS. 1-10, including a far edge datacenter 206 including the scheduler 110 (FIG. 1) and/or MLBS instances 222(1)-(n) (FIG. 2A). A plurality of servers 901 are managed by datacenter management controller 902. Load balancer 903 distributes requests and computing workloads over servers 901 to avoid a situation wherein a single server may become overwhelmed. Load balancer 903 maximizes available capacity and performance of the resources in datacenter 900. Routers/switches 904 support data traffic between servers 901 and between datacenter 900 and external resources and users (not shown) via an external network 905, which may be, for example, a local area network (LAN) or the Internet.

Servers 901 may be standalone computing devices, and/or they may be configured as individual blades in a rack of one or more server devices. Servers 901 have an input/output (I/O) connector 906 that manages communication with other database entities. One or more host processors 907 on each server 901 run a host operating system (O/S) 908 that supports multiple virtual machines (VM) 909. Each VM 909 may run its own O/S so that each VM O/S 910 on a server is different, or the same, or a mix of both. The VM O/Ss 910 may be, for example, different versions of the same O/S (e.g., different VMs running different current and legacy versions of the Windows® operating system). In addition, or alternatively, the VM O/Ss 910 may be provided by different manufacturers (e.g., some VMs running the Windows® operating system, while other VMs are running the Linux® operating system). Each VM 909 may also run one or more applications (App) 911. Each server 901 also includes storage 912 (e.g., hard disk drives (HDD)) and memory 913 (e.g., RAM) that can be accessed and used by the host processors 907 and VMs 909 for storing software code, data, etc. In one embodiment, a VM 909 may employ the data plane APIs as disclosed herein.

Datacenter 900 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 900 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 909 on server 901 to run their applications 911. When demand for an application 911 increases, the datacenter 900 may activate additional VMs 909 on the same server 901 and/or on a new server 901N as needed. These additional VMs 909 can be deactivated if demand for the application later drops.

Datacenter 900 may offer guaranteed availability, disaster recovery, and back-up services. For example, the datacenter may designate one VM 909 on server 901 as the primary location for the tenant's application and may activate a second VM 909 on the same or a different server as a standby or back-up in case the first VM or server 901 fails. Datacenter management controller 902 automatically shifts incoming user requests from the primary VM to the back-up VM without requiring tenant intervention. Although datacenter 900 is illustrated as a single location, it will be understood that servers 901 may be distributed to multiple locations across the globe to provide additional redundancy and disaster recovery capabilities. Additionally, datacenter 900 may be an on-premises, private system that provides services to a single enterprise user or may be a publicly accessible, distributed system that provides services to multiple, unrelated customers and tenants or may be a combination of both.

Domain Name System (DNS) server 914 resolves domain and host names into IP addresses for all roles, applications, and services in datacenter 900. DNS log 915 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 916 monitors the health of the physical systems, software, and environment in datacenter 900. Datacenter health monitoring 916 provides feedback to datacenter managers when problems are detected with servers, blades, processors, or applications in datacenter 900 or when network bandwidth or communications issues arise.

Access control service 917 determines whether users are allowed to access particular connections and services provided at the datacenter 900. Directory and identity management service 918 authenticates user credentials for tenants on datacenter 900. Further, as described in detail herein, in some aspects the datacenter 900 may be a far edge DC (e.g., the far edge DC 206). Accordingly, in some aspects, the datacenter 900 may include the DU 216 (not shown in FIG. 9).

Figure 10:
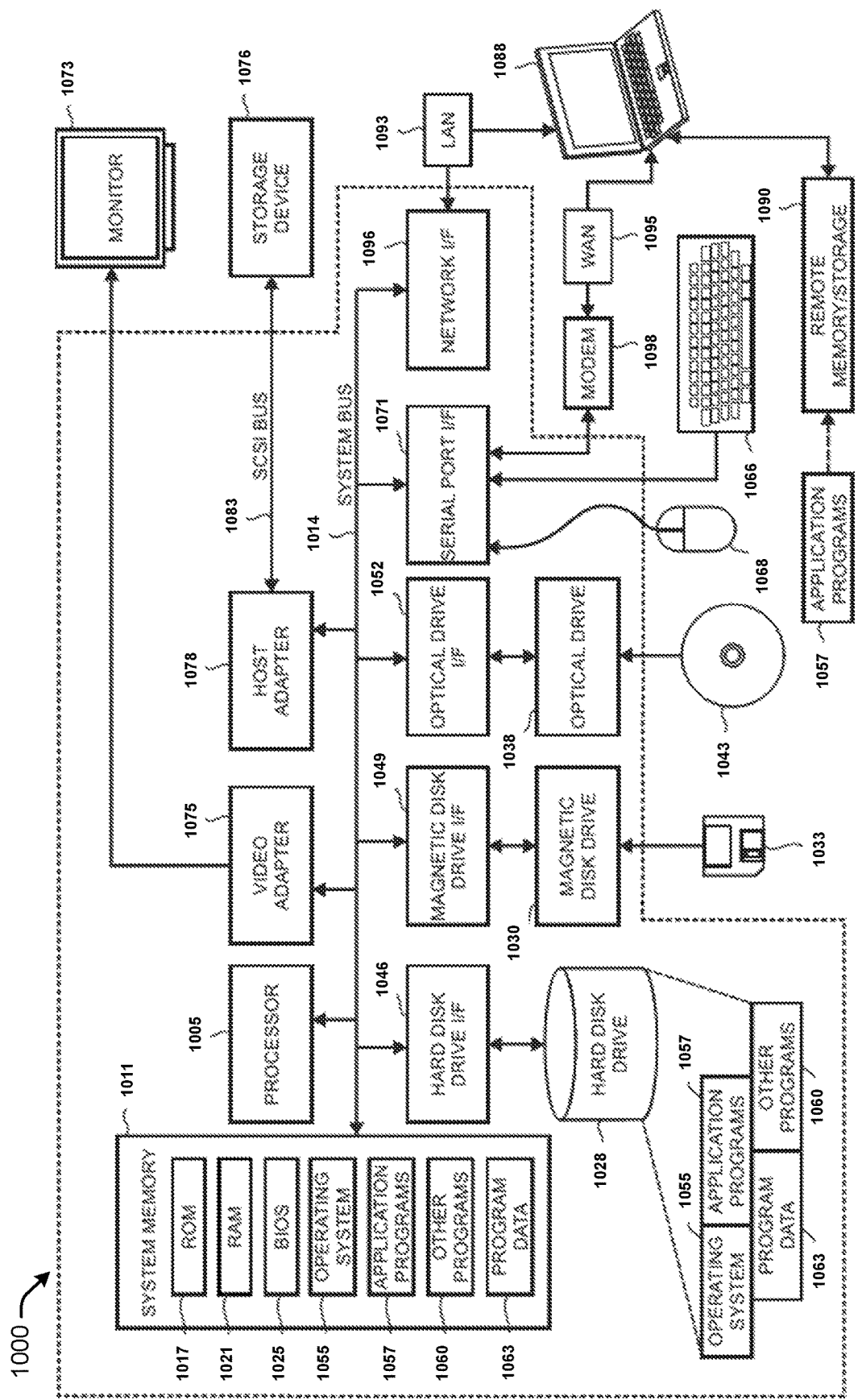
FIG. 10 is a block diagram illustrating an example of a hardware implementation for a computer system, in accordance with some aspects of the present disclosure.

FIG. 10 is a block diagram illustrating an example of a hardware implementation for a computer system, which may include aspects of any computer device (e.g., datacenter system 102, RU 104, UE 106) in accordance with some aspects of the present disclosure. Computer system 1000 includes a processor 1005, a system memory 1011, and a system bus 1014 that couples various system components including the system memory 1011 to the processor 1005. The system bus 1014 may be any of several types of bus structures including a memory bus or memory controller, a peripheral bus, or a local bus using any of a variety of bus architectures. The system memory 1011 includes read only memory (ROM) 107 and random access memory (RAM) 1021. A basic input/output system (BIOS) 1025, containing the basic routines that help to transfer information between elements within the computer system 1000, such as during startup, is stored in ROM 1017. The computer system 1000 may further include a hard disk drive 1028 for reading from and writing to an internally disposed hard disk (not shown), a magnetic disk drive 1030 for reading from or writing to a removable magnetic disk 1033 (e.g., a floppy disk), and an optical disk drive 1038 for reading from or writing to a removable optical disk 1043 such as a CD (compact disc), DVD (digital versatile disc), or other optical media. The hard disk drive 1028, magnetic disk drive 1030, and optical disk drive 1038 are connected to the system bus 1014 by a hard disk drive interface 1046, a magnetic disk drive interface 1049, and an optical drive interface 1052, respectively. The drives and their associated computer-readable storage media provide non-volatile storage of computer-readable instructions, data structures, program modules, and other data for the computer system 1000. Although this illustrative example includes a hard disk, a removable magnetic disk 1033, and a removable optical disk 1043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present 5G admission by verifying slice SLA guarantees. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1033, optical disk 1043, ROM 1017, or RAM 1021, including an operating system 1055, one or more application programs 1057, other program modules 1060, and program data 1063. A user may enter commands and information into the computer system 1000 through input devices such as a keyboard 1066 and pointing device 1068 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1005 through a serial port interface 1071 that is coupled to the system bus 1014, but may be connected by other interfaces, such as a parallel port, game port, or universal serial bus (USB). A monitor 1073 or other type of display device is also connected to the system bus 1014 via an interface, such as a video adapter 1075. In addition to the monitor 1073, personal computers typically include other peripheral output devices (not shown), such as speakers and printers. The illustrative example shown in FIG. 10 also includes a host adapter 1078, a Small Computer System Interface (SCSI) bus 1083, and an external storage device 1076 connected to the SCSI bus 1083.

The computer system 1000 is operable in a networked environment using logical connections to one or more remote computers, such as a remote computer 1088. The remote computer 1088 may be selected as another personal computer, a server, a router, a network PC, a peer device, or other common network node, and typically includes many or all of the elements described above relative to the computer system 1000, although only a single representative remote memory/storage device 1090 is shown in FIG. 10. The logical connections depicted in FIG. 10 include a local area network (LAN) 1093 and a wide area network (WAN) 1095.

Such networking environments are often deployed, for example, in offices, enterprise-wide computer networks, intranets, and the Internet.

When used in a LAN networking environment, the computer system 1000 is connected to the local area network 1093 through a network interface or adapter 1096. When used in a WAN networking environment, the computer system 1000 typically includes a broadband modem 1098, network gateway, or other means for establishing communications over the wide area network 1095, such as the Internet. The broadband modem 1098, which may be internal or external, is connected to the system bus 1014 via a serial port interface 1071. In a networked environment, program modules related to the computer system 1000, or portions thereof, may be stored in the remote memory storage device 1090. It is noted that the network connections shown in FIG. 10 are illustrative and other means of establishing a communications link between the computers may be used depending on the specific requirements of an application of the present 5G admission by verifying slice SLA guarantees.

Example Clauses

A. A method of resource allocation for wireless communication at a far edge datacenter, comprising: receiving a plurality of scheduling requests each associated with a respective application of a plurality of applications on a plurality of wireless devices; identifying a plurality of current channel state information each associated with one of the plurality of wireless devices; identifying a plurality of different types of service level requirements each associated with one of the plurality of applications; determining, by a machine learning based scheduler (MLBS) based on each of the plurality of current channel state information, a sequence of resource assignments expected to meet the plurality of different types of service level requirements, the sequence of resource assignments including a plurality of grants of a scheduled assignment of a resource and a modulation coding scheme to each of the plurality of applications; and transmitting respective ones of the plurality of grants for the plurality of applications to the plurality of wireless devices.

B. The method as paragraph A recites, wherein the plurality of different types of service level requirements include at least one of central processing unit (CPU) utilization, data throughput, energy usage, bit error rate, packet error rate, latency, or a permitted deviation from at least one of the plurality of different types of service level requirements.

C. The method as any of paragraphs A-B recite, wherein determining the sequence of resource assignments comprising assigning, via each scheduled assignment, each resource to each of the plurality of applications in order to meet the plurality of different types of service level requirements over a period of time based on historical constraint information.

D. The method as any of paragraphs A-C recite, wherein the resource is a resource block for an uplink communication or a downlink communication in a slot of a frame.

E. The method as any of paragraphs A-D recite, wherein the sequence of resource assignments includes a first grant of a first scheduled assignment of a first resource having a first numerology to a first application of the plurality of applications, and a second grant of a second scheduled assignment of a second resource having a second numerology to a second application of the plurality of applications.

F. The method as any of paragraphs A-D recite, wherein the MLBS is a first MLBS, the modulation coding scheme is a first modulation coding scheme, and further comprising receiving a scheduling request associated with another wireless device different from the plurality of wireless devices; identifying current channel state information associated with the another wireless device; identifying a service level requirement associated with the another wireless device, the service level requirement corresponding to a second MLBS of a second virtual network slice having a different numerology than a first virtual network slice corresponding the first MLBS; determining, by the second MLBS based on at least the current channel state information, a second sequence of resource assignments expected to meet at least the service level requirement, the second sequence of resource assignments including a grant of a scheduled assignment of the resource and a second modulation coding scheme to the another wireless device; and transmitting the grant to the another wireless device.

G. The method as any of paragraphs A-F recite, wherein determining the sequence of resource assignments, comprises predicting, via the MLBS, a plurality of expected channel state information based on the plurality of current channel state information, the plurality of expected channel state information each associated with one of the plurality of wireless devices; and determining, by a reward policy of a reinforcement learning agent of the MLBS, the sequence of resource assignments expected to meet the plurality of different types of service level requirements based on the plurality of expected channel state information.

H. The method as any of paragraphs A-G recite, further comprising: receiving, from at least the base station, a third set of one or more SSB beams; generating, based on the third set of one or more SSB beams, one or more of training measurements for generating the prediction model; and transmitting the one or more of training measurements to the base station.

I. The method as paragraph H recites, further comprising generating synthetic state data representing a plurality of wireless environments and/or mobility contexts; determining a slot allocation based on the synthetic state data; identifying updated state data resulting from the slot allocation; determining a reward based on the updated state data and a type of service level requirement of the plurality of different types of service level requirements; and training, via the reward, the reward policy to meet the type of service level requirement.

J. The method as paragraph H recites, further comprising generating, via a ray tracing propagation model, synthetic channel state data representing a plurality of wireless environments and/or mobility contexts; and training the reward policy via the synthetic channel state data.

K. The method as paragraph H recites, further comprising collecting training information corresponding to an environmental condition or usage context of a base station; and updating the reward policy via the training information.

L. A device comprising a memory storing computer-executable instructions; and at least one processor coupled with the memory and configured to execute the computer-executable instructions to perform the method of any of paragraphs A-K.

M. A device, comprising means for performing the method of any of paragraphs A-K.

N. A non-transitory computer-readable medium storing computer executable code, the code when executed by a processor causes the processor to perform the method of any of paragraphs A-K.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A device comprising:
a memory; and
at least one processor coupled to the memory and configured to:
receive a plurality of scheduling requests each associated with a respective application of a plurality of applications on a plurality of wireless devices;
identify a plurality of current channel state information each associated with one of the plurality of wireless devices;
identify a plurality of different types of service level requirements each associated with one of the plurality of applications;
predict, by a machine learning based scheduler (MLBS) based on each of the plurality of current channel state information, a plurality of expected channel state information based on the plurality of current channel state information, the plurality of expected channel state information each associated with one of the plurality of wireless devices;
generate synthetic state data representing a plurality of wireless environments or mobility contexts;
determine a slot allocation based on the synthetic state data;
identify updated state data resulting from the slot allocation;
determine a reward based on the updated state data and a type of service level requirement of the plurality of different types of service level requirements;
train, via the reward, a reward policy of a reinforcement learning agent of the MLBS to meet the type of service level requirement;
determine, by the reward policy, a sequence of resource assignments expected to meet the plurality of different types of service level requirements based on the plurality of expected channel state information, the sequence of resource assignments including a plurality of grants of a scheduled assignment of a resource and a modulation coding scheme to each of the plurality of applications; and
transmit respective ones of the plurality of grants of the scheduled assignment of the resource for the plurality of applications to the plurality of wireless devices.

2. The device of claim 1, wherein the plurality of different types of service level requirements include at least one of central processing unit (CPU) utilization, data throughput, energy usage, bit error rate, packet error rate, latency, or a permitted deviation from at least one of the plurality of different types of service level requirements.

3. The device of claim 1, wherein to determine the sequence of resource assignments, the at least one processor is further configured to:
assign, via each scheduled assignment, each resource to each of the plurality of applications in order to meet the plurality of different types of service level requirements over a period of time based on historical constraint information.

4. The device of claim 1, wherein the resource is a resource block for an uplink communication or a downlink communication in a slot of a frame.

5. The device of claim 1, wherein the sequence of resource assignments includes a first grant of a first scheduled assignment of a first resource having a first numerology to a first application of the plurality of applications, and a second grant of a second scheduled assignment of a second resource having a second numerology to a second application of the plurality of applications.

6. The device of claim 1, wherein the MLBS is a first MLBS, the modulation coding scheme is a first modulation coding scheme, and the at least one processor is further configured to:
receive a scheduling request associated with another wireless device different from the plurality of wireless devices;
identify current channel state information associated with the another wireless device;
identify a service level requirement associated with the another wireless device, the service level requirement corresponding to a second MLBS of a second virtual network slice having a different numerology than a first virtual network slice corresponding the first MLBS;
determine, by the second MLBS based on at least the current channel state information, a second sequence of resource assignments expected to meet at least the service level requirement, the second sequence of resource assignments including a respective grant of a respective scheduled assignment of the resource and a second modulation coding scheme to the another wireless device; and
transmit the respective grant to the another wireless device.

7. The device of claim 1, wherein the at least one processor is further configured to:
generate, via a ray tracing propagation model, synthetic channel state data representing a plurality of wireless environments or mobility contexts;
wherein to train the reward policy, the at least one processor is further configured to train the reward policy via the synthetic channel state data.

8. The device of claim 1, wherein the at least one processor is further configured to:
collect training information corresponding to an environmental condition or usage context of a base station; and
update the reward policy via the training information.

9. A method of resource allocation for wireless communication at a far edge datacenter, comprising:
receiving a plurality of scheduling requests each associated with a respective application of a plurality of applications on a plurality of wireless devices;
identifying a plurality of current channel state information each associated with one of the plurality of wireless devices;
identifying a plurality of different types of service level requirements each associated with one of the plurality of applications;
predicting, by a machine learning based scheduler (MLBS) based on each of the plurality of current channel state information, a plurality of expected channel state information based on the plurality of current channel state information, the plurality of expected channel state information each associated with one of the plurality of wireless devices;
determining a reward based on a type of service level requirement of the plurality of different types of service level requirements;

generating, via a ray tracing propagation model, synthetic channel state data representing a plurality of wireless environments or mobility contexts;

training, via the reward and the synthetic channel state data, a reward policy of a reinforcement learning agent of the MLBS to meet the type of service level requirement;

determining, by the reward policy, a sequence of resource assignments expected to meet the plurality of different types of service level requirements based on the plurality of expected channel state information, the sequence of resource assignments including a plurality of grants of a scheduled assignment of a resource and a modulation coding scheme to each of the plurality of applications; and transmitting respective ones of the plurality of grants of the scheduled assignment of the resource for the plurality of applications to the plurality of wireless devices.

10. The method of claim 9, wherein the plurality of different types of service level requirements include at least one of central processing unit (CPU) utilization, data throughput, energy usage, bit error rate, packet error rate, latency, or a permitted deviation from at least one of the plurality of different types of service level requirements.

11. The method of claim 9, wherein determining the sequence of resource assignments comprises:
assigning, via each scheduled assignment, each resource to each of the plurality of applications in order to meet the plurality of different types of service level requirements over a period of time based on historical constraint information.

12. The method of claim 9, wherein the resource is a resource block for an uplink communication or a downlink communication in a slot of a frame.

13. The method of claim 9, wherein the sequence of resource assignments includes a first grant of a first scheduled assignment of a first resource having a first numerology to a first application of the plurality of applications, and a second grant of a second scheduled assignment of a second resource having a second numerology to a second application of the plurality of applications.

14. The method of claim 9, further comprising:
generating synthetic state data representing a plurality of wireless environments or mobility contexts;
determining a slot allocation based on the synthetic state data; and
identifying updated state data resulting from the slot allocation;
wherein determining the reward comprises determining the reward based on the updated state data and a type of service level requirement of the plurality of different types of service level requirements.

15. A non-transitory computer-readable device having instructions thereon that, when executed by at least one computing device, causes the at least one computing device to perform operations comprising:
receiving a plurality of scheduling requests each associated with a respective application of a plurality of applications on a plurality of wireless devices;
identifying a plurality of current channel state information each associated with one of the plurality of wireless devices;
identifying a plurality of different types of service level requirements each associated with one of the plurality of applications;

predicting, by a machine learning based scheduler (MLBS) based on each of the plurality of current channel state information, a plurality of expected channel state information based on the plurality of current channel state information, the plurality of expected channel state information each associated with one of the plurality of wireless devices;

generating synthetic state data representing a plurality of wireless environments or mobility contexts;

determining a slot allocation based on the synthetic state data;

identifying updated state data resulting from the slot allocation;

determining a reward based on the updated state data and a type of service level requirement of the plurality of different types of service level requirements;

training, via the reward, a reward policy of a reinforcement learning agent of the MLBS to meet the type of service level requirement;

determining, by the reward policy, a sequence of resource assignments expected to meet the plurality of different types of service level requirements based on the plurality of expected channel state information, the sequence of resource assignments including a plurality of grants of a scheduled assignment of a resource and a modulation coding scheme to each of the plurality of applications; and transmitting respective ones of the plurality of grants of the scheduled assignment of the resource for the plurality of applications to the plurality of wireless devices.

16. The non-transitory computer-readable device of claim 15, wherein the plurality of different types of service level requirements include at least one of central processing unit (CPU) utilization, data throughput, energy usage, bit error rate, packet error rate, latency, or a permitted deviation from at least one of the plurality of different types of service level requirements.

17. The non-transitory computer-readable device of claim 15, wherein the MLBS is a first MLBS, the modulation coding scheme is a first modulation coding scheme, and the operations further comprising:
receiving a scheduling request associated with another wireless device different from the plurality of wireless devices;
identifying current channel state information associated with the another wireless device;
identifying a service level requirement associated with the another wireless device, the service level requirement corresponding to a second MLBS of a second virtual network slice having a different numerology than a first virtual network slice corresponding the first MLBS;
determining, by the second MLBS based on at least the current channel state information, a second sequence of resource assignments expected to meet at least the service level requirement, the second sequence of resource assignments including a respective grant of a respective scheduled assignment of the resource and a second modulation coding scheme to the another wireless device; and
transmitting the respective grant to the another wireless device.

* * * * *